F. E. ZAISS.
MACHINE FOR MAKING CANDY.
APPLICATION FILED DEC. 8, 1919.

1,400,128.

Patented Dec. 13, 1921.
3 SHEETS—SHEET 1.

Inventor
Fred E. Zaiss
By Fred Gerlach
Atty.

F. E. ZAISS.
MACHINE FOR MAKING CANDY.
APPLICATION FILED DEC. 8, 1919.

1,400,128.

Patented Dec. 13, 1921.
3 SHEETS—SHEET 2.

Inventor
Fred E. Zaiss
By [signature]
Atty.

F. E. ZAISS.
MACHINE FOR MAKING CANDY.
APPLICATION FILED DEC. 8, 1919.

1,400,128.

Patented Dec. 13, 1921.
3 SHEETS—SHEET 3.

Inventor
Fred E. Zaiss
By Fred Gerlach
Atty.

UNITED STATES PATENT OFFICE.

FRED E. ZAISS, OF CHICAGO, ILLINOIS.

MACHINE FOR MAKING CANDY.

1,400,128.   Specification of Letters Patent.   Patented Dec. 13, 1921.

Application filed December 8, 1919. Serial No. 343,253.

*To all whom it may concern:*

Be it known that I, FRED E. ZAISS, a citizen of the United States, and a resident of Chicago, in the county of Cook and State of Illinois, have invented certain new and useful Improvements in Machines for Making Candy, of which the following is a full, clear, and exact description.

The invention relates to machines for making candy.

The object of the invention is to provide improved means for feeding a strip of candy to mechanism for twisting or otherwise shaping the strip into pieces of commercial size. Another object of the invention is to provide improved feeding mechanism for a strip of candy which is adjustable so that it may be used to feed strips of different shapes to the finishing mechanism.

The invention consists in the several novel features hereinafter set forth and more particularly defined by claims at the conclusion hereof.

Figure 1:
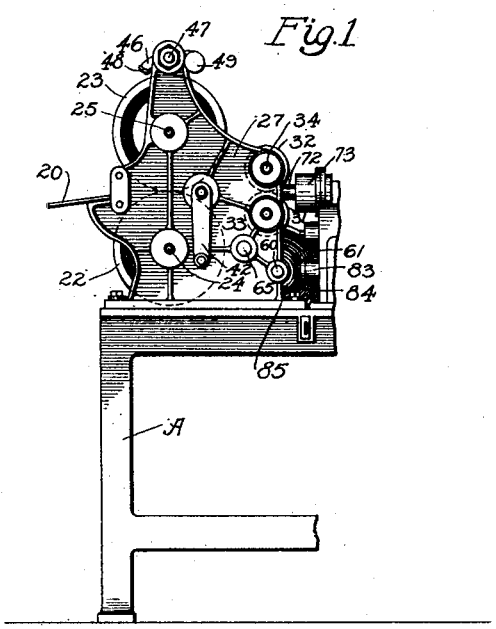
Figure 8:
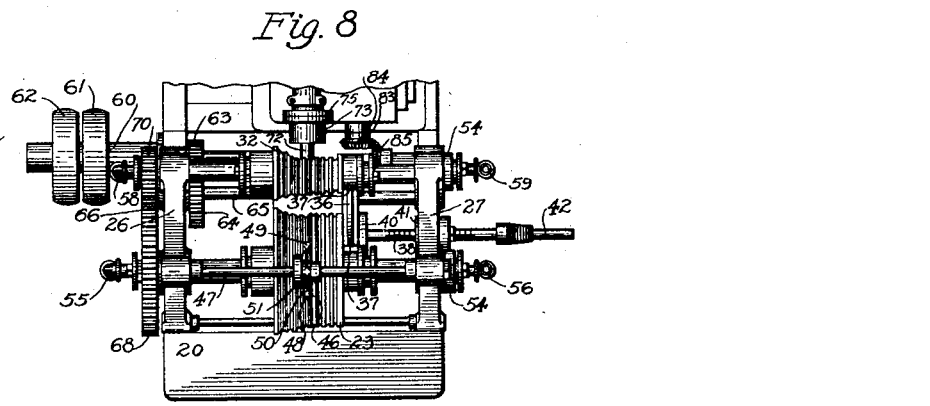
Figure 3:
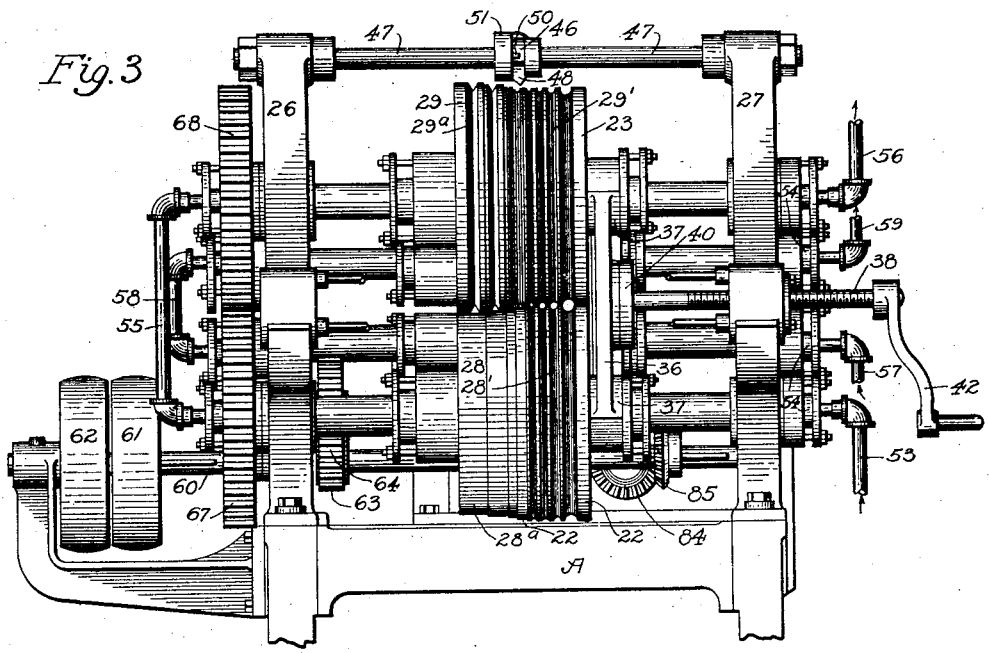
Figure 2:
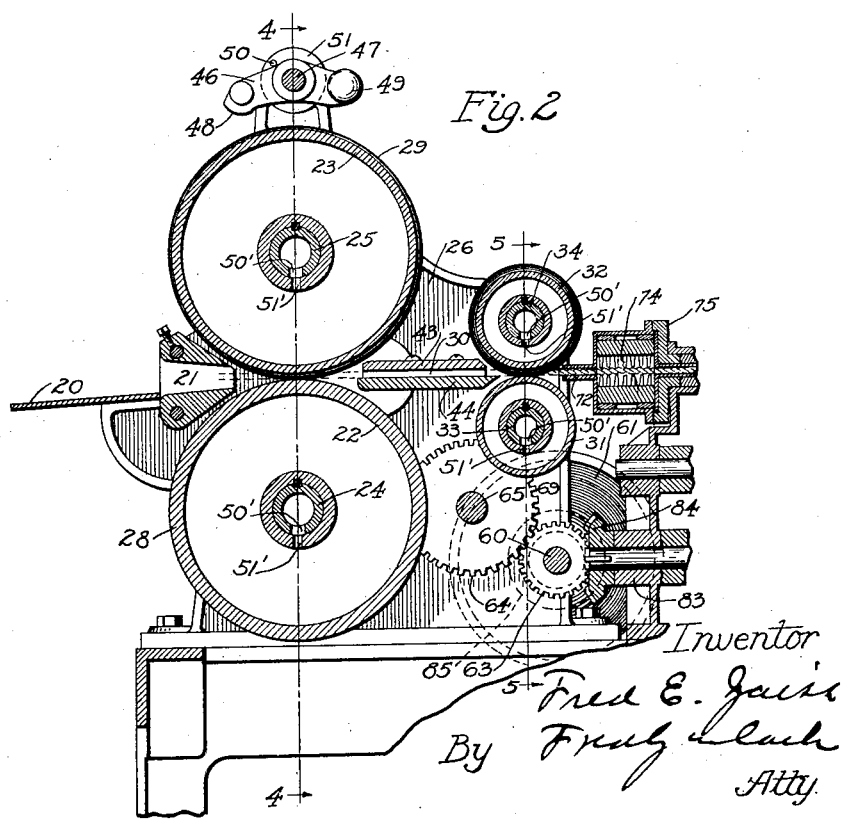
Figure 4:
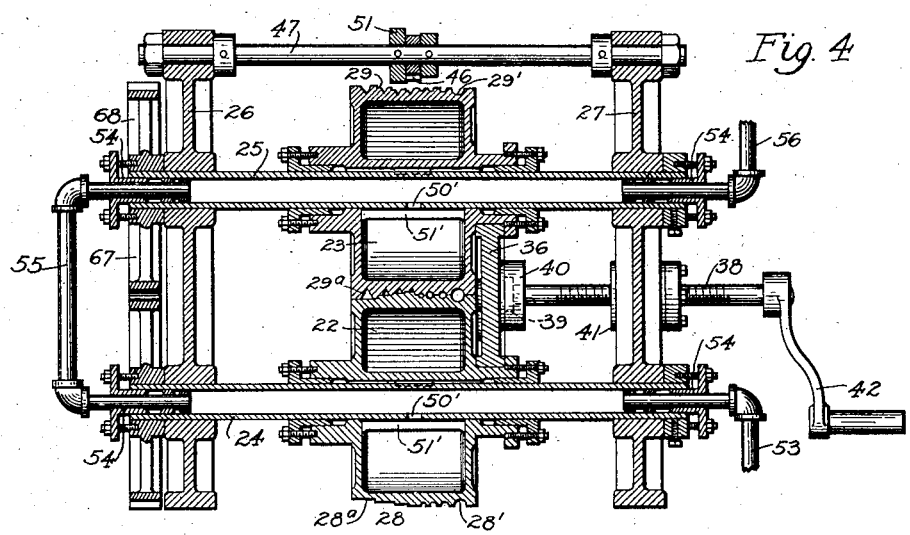
Figure 5:
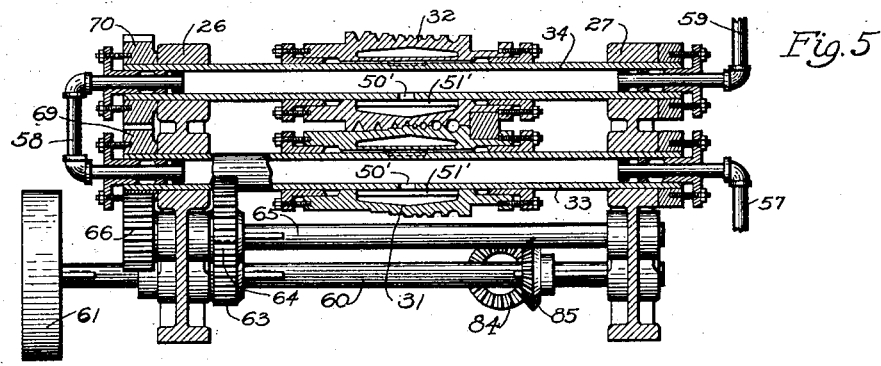
Figure 6:
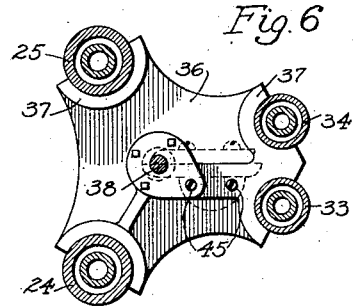
Figure 7:
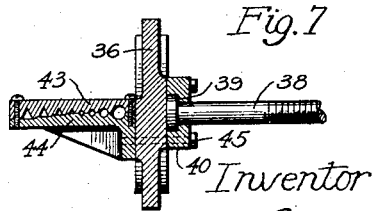

In the drawings: Figure 1 is a side elevation of a machine embodying the invention. Fig. 2 is a longitudinal section. Fig. 3 is a rear elevation. Fig. 4 is a section on line 4—4 of Fig. 2. Fig. 5 is a section on line 5—5 of Fig. 2. Fig. 6 is an inside elevation of the adjusting bracket, the hubs of the rolls adjusted thereby being shown in section. Fig. 7 is a detail of the adjusting bracket for the rolls. Fig. 8 is a plan of the machine.

The continuous length or stream of candy passes from a suitable supply over a table 20 and through a nozzle 21 to a pair of continuously rotating coacting shaping and feed rolls 22 and 23. The lower roll 22 is slidably mounted upon, and rotatable with, a hollow shaft 24 and the upper roll 23 is similarly mounted upon a hollow shaft 25. These shafts are mounted in brackets 26 and 27 which are secured on a main frame A. These rolls are provided with peripheral grooves 28 and 29 which are adapted to shape the continuous strip of candy into the desired cross-sectional form and size or diameter. In practice, some twisted candy is round and the grooves 28' and 29' are shaped to make the strip cylindrical or round. The grooves 29ª on the roll 23 coacting with the cylindrical surfaces 28ª for the lower roller 22 are adapted to shape the strip or stream into triangular form of different sizes. From the rolls 22 and 23, the strip of candy passes through a suitable stationary guide 30 and thence to a pair of combined gripping and feed rolls 31 and 32. This guide 30 is formed of upper and lower sections 43 and 44 between which passages are formed corresponding substantially to the different shapes given to the candy by the shaping rolls, these passages being alined with the respective grooves in said rolls. This guide is secured by screws 45 to the inner side of an adjusting bracket 36. Roll 31 is slidably mounted on and rotatable with a hollow shaft 33 and roll 32 is similarly mounted on a hollow shaft 34. Shafts 33 and 34 are mounted in suitable bearings in the frame brackets 26 and 27. Rolls 31 and 32 are grooved similarly to the shaping rolls 22 and 23 so they will be adapted for handling all of the shapes and sizes formed by the shaping rolls.

In machines for twisting or otherwise shaping the strip, mechanism for acting upon the strip issuing from the rolls 31 and 32 is usually adapted to operate upon a strip at a given point, and to adapt the shaping and feed mechanism for coöperation with the finishing mechanism, the rolls 22 and 23, 31 and 32 and the guide 30 are conjointly and transversely adjustable to permit any of the grooves in these rolls to be brought into position to deliver the candy to or in alinement with the axis of the twister or finishing mechanism. For this purpose, all of these rolls are slidable on their respective shafts so that they may be adjusted transversely and are connected to their respective shafts so they will be rotated thereby in any adjustment. For the purpose of effecting conjoint, transverse adjustment of all of the rolls, a bracket 36 is fitted with terminals or forks 37 for engaging grooves in the hubs of rolls 22, 23, 31 and 32 respectively. A screw 38 is provided with a crank 42 and is threaded to a sleeve 41 which is fixed in bracket 27 and has its inner end provided with a flange 39. The latter is rotatably held in a cap 40 on one side of the adjusting bracket 36. The lower section 44 of guide 30 is secured to bracket 36 by bolts 45 and the upper section 43 is secured to the lower section by screws. Rotation of the crank 42 will shift the screw 38 longitudinally and the latter, through bracket 36, will conjointly shift all of the rolls and guide 30. As a result of this construction, the shaping rolls 22 and 23 and the continued feed and gripping rolls 31 and 32 and the intermediate stationary guide may be conjointly adjusted transversely to bring strips of different shapes into correct position to feed the stick to the twister or finishing mechanism.

To guide the operator in truly positioning the desired grooves of the shaping and feed rolls into desired alinement, a gage 46 is pivotally held on a cross rod 47. The latter is supported in brackets 26 and 27. The gage is provided with a finger 48 having a pointed edge which is adapted to be swung downwardly into either of the grooves in the upper rolls 23 to determine whether the center of the grooves is in alinement with the axis of the finishing mechanism. The gage is provided at one side of its pivot with a weight 49 which is adapted to normally hold the gage inoperative and against a stop 50 on a collar 51 on the rod 47. When the groove which is to be used is brought into alinement with the pointed edge of the gage, the feed-mechanism will be correctly set to deliver a strip of the desired shape to the finishing mechanism.

In practice, it is necessary to heat the shaping and finishing rolls to keep the candy hot, and for this purpose the shafts 24 and 25 for the rolls 22 and 23 and the shafts 33 and 34 for the rolls 31 and 32 are hollow and steam is circulated through them. An opening 50' is formed in each of these shafts and an elongated opening 51' is formed in the hub of each of said rolls. Each opening 50' communicates with an opening 51' in all of the transverse adjustments of the rolls, so that steam will be supplied to the rolls in all of their adjustments. Steam is supplied into the shaft 24 for the roll 22 by a pipe 53. A pipe 55 conducts steam from the other end of shaft 24 into one end of the shaft 25. An exhaust pipe 56 is connected to the other end of shaft 25. Pipe 57 supplies steam to one end of the hollow shaft 33 of roll 31 and a pipe 58 conducts steam from the other end of the shaft to one end of the shaft 34 for the roll 32. An exhaust pipe 59 is connected to the other end of shaft 34. These shafts and steam pipes are connected by suitable stuffing boxes 54.

Rolls 22 and 23 and 31 and 32 are continuously driven to supply a strip to the finishing mechanism. The driving mechanism for these rolls comprises a transverse shaft 60 which is provided with fixed and loose pulleys 61 and 62. A pinion 63 meshes with a gear 64 on a shaft 65 which is mounted in brackets 26 and 27 and is provided at one end with a pinion 66. Intermeshing gears 67 and 68 on shafts 24 and 25 respectively are driven by pinion 66 which meshes with the gear 67. Intermeshing gears 69 and 70 on shafts 34 respectively are also driven by pinion 66 which meshes with the gear 69. This driving mechanism serves to operate the shaping and feed rolls continuously. A twister-casing composed of sections 73, 75, contains a twister brush 74 and is provided with a nozzle 72 for guiding the shaped stick into the twister. A bracket 83, by which the twister mechanism is supported, is suitably secured to the main frame. A beveled pinion 85 on shaft 60 meshes with a beveled pinion 84 to operate a shaft which is mounted in bracket 83 to operate mechanism for acting upon the stick after it leaves the shaping rolls.

The operation of the machine will be as follows: Shaping rolls 22 and 23 and the gripping rolls 31 and 32 and guide 30 will be first adjusted into position by screw-rod 38 to bring grooves, for giving the continuous strip of candy the desired shape and size, into alinement with and into position to feed the shaped strip into the twister or finishing mechanism. Assuming the machine to be running, a continuous stream or strip of candy will be fed through the nozzle 21 to the rolls 22 and 23, thence through the guide 30 to the gripping and feed rolls 31 and 32. While the candy is passing through the rolls, it will be kept hot so it can be handled. Rolls 22 and 23 will shape the regular round strip into a strip of the desired shape and size. The shape of the strip will be retained while it is passing through the stationary guide 30 and in the feed and gripping rolls 31 and 32. The rolls 31 and 32 serve to feed the strip away from the shaping rolls 22 and 23 and to grip the strip against rotation.

The invention exemplifies improved shaping and feed mechanism for a strip of candy which may be readily adjusted for different shapes and sizes of candy and in which provision is made for keeping the strip hot in transit through the rolls.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine of the character described, the combination of a pair of rolls for shaping and feeding a strip of candy and provided with means to shape different strips, mechanism for driving said rolls, means for heating said rolls, mechanism for acting upon the shaped strip after it leaves the rolls and means for conjointly adjusting the rolls to bring different portions thereof into position for coöperation with mechanism for acting upon the shaped strip.

2. In a machine of the character described, the combination of a pair of rolls for shaping and feeding a strip of candy and having grooves for shaping different strips, mechanism for driving said rolls, means for heating said rolls, mechanism for acting upon the shaped strip after it leaves the rolls and means for conjointly adjusting the rolls to bring different grooves into position for coöperation with mechanism for acting upon the shaped strip.

3. In a machine of the character described, the combination of a pair of rolls for shaping and feeding a strip of candy and having means for shaping different strips, mechanism for driving said rolls, means for heating said rolls, mechanism for acting upon the shaped strip after it leaves the rolls, a guide having passages for the differently shaped strips, and means for conjointly adjusting the rolls and the guide to bring different portions thereof into position for coöperation with mechanism for acting upon the shaped strip.

4. In a machine of the character described, the combination of a pair of rolls provided with means for shaping different strips, another pair of feed-rolls also provided with means for shaping different strips, mechanism for driving both pairs of rolls, mechanism for acting upon the shaped strip after it leaves the rolls, means for heating the rolls, and means for conjointly adjusting both pairs of rolls to bring different portions thereof into operative relation with the mechanism for acting upon the shaped strip.

5. In a machine of the character described, the combination of a pair of rolls provided with grooves for shaping different strips, another pair of feed rolls also provided with grooves for shaping different strips, mechanism for driving both pairs of rolls, means for heating the rolls, mechanism for acting upon the shaped strip after it leaves the rolls and means for conjointly adjusting both pairs of rolls to bring different shaped grooves into operative relation with the mechanism for acting upon the shaped strip.

6. In a machine of the character described, the combination of a pair of shaping rolls, a pair of feed rolls, both of said pairs of rolls having grooves for different strips, a guide between said pairs of rolls, mechanism for driving the rolls, mechanism for acting upon the shaped strip after it leaves the rolls, means for heating the rolls, and means for conjointly adjusting the guide and both pairs of rolls.

7. In a machine of the character described, the combination of a pair of feed rolls, a pair of gripping rolls, both of said pairs of rolls having means for shaping different strips, a stationary guide between said pairs of rolls having passages for the different strips, mechanism for driving the rolls, mechanism for acting upon the shaped strip after it leaves the rolls, means for heating the rolls and means for conjointly adjusting the guide and both pairs of rolls.

8. In a machine of the character described, the combination of a pair of rolls provided with means for shaping different strips, hollow shafts for the rolls respectively, mechanism for driving said shafts, means for heating the rolls through said shafts, said rolls being slidable on said shafts, mechanism for acting upon the shaped strip after it leaves the rolls and means for conjointly adjusting the rolls on the shafts.

9. In a machine of the character described, the combination of a pair of rolls provided with means for shaping different strips, hollow shafts for the rolls respectively, mechanism for driving said shafts, means for heating the rolls through said shafts, said rolls being slidable on said shafts, a stationary guide provided with passages for different strips, mechanism for acting upon the shaped strip after it leaves the rolls and means for conjointly adjusting the rolls on the shafts and correspondingly shifting said guide.

10. In a machine of the character described, the combination of a plurality of pairs of rolls provided with means for forming a continuous strip into different shapes, hollow shafts for the rolls respectively, means for heating the rolls through the shafts, mechanism for driving the shafts, said rolls being slidably mounted on the shafts respectively, mechanism for acting upon the shaped strip after it leaves the rolls and means for conjointly adjusting the pairs of rolls.

11. In a machine of the character described, the combination of a pair of feed rolls adapted for shaping different strips, mechanism for driving the rolls, means for heating the rolls, mechanism for acting upon the shaped strip after it leaves the rolls, mechanism for adjusting the rolls laterally, and a gage for indicating the operative portion of the rolls.

12. In a machine of the character described, the combination of a pair of rolls provided with means for forming a continuous strip into different shapes, shafts for the rolls respectively, a guide provided with passages for differently shaped strips, a bracket on which the guide is supported, an adjusting connection between the bracket and the rolls, mechanism for acting upon the shaped strip after it leaves the rolls and means for adjusting the bracket to conjointly adjust the rolls and the guide.

13. In a machine of the character described, the combination of a plurality of pairs of rolls provided with differently shaped grooves for the strip, shafts for the rolls respectively, means for heating the rolls through the shafts, a guide provided with passages for the differently shaped strips disposed between the pairs of rolls, a bracket on which the guide is mounted, provided with means for engaging the rolls to shift them laterally, mechanism for acting upon the shaped strip after it leaves the rolls and a screw for adjusting the bracket to conjointly shift the rolls and the guide.

14. In a machine of the character described, the combination of a plurality of pairs of rolls provided with means for forming a continuous strip into different shapes, hollow shafts for the rolls respectively, means for heating the rolls through the shafts, mechanism for driving the shafts, said rolls being slidably mounted on the shafts respectively, a guide between the pairs of rolls, mechanism for acting upon the shaped strip after it leaves the rolls and means for conjointly adjusting the pairs of rolls and said guide.

FRED E. ZAISS.